3,061,631
PHENYL PROPARGYLOXYBENZOATE

George B. Sterling, Midland, and Chester E. Pawloski, Bay City, Mich., assignors to The Dow Chemical Company, Midland, Mich., a corporation of Delaware
No Drawing. Filed Mar. 23, 1961, Ser. No. 97,721
3 Claims. (Cl. 260—474)

This invention is directed to phenyl propargyloxybenzoate corresponding to the formula

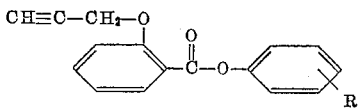

In this and succeeding formulae, R represents hydrogen or lower alkyl. The expression "lower alkyl" is employed in the present specification and claims to refer to the alkyl radicals containing from 1 to 5 carbon atoms, inclusive. These new compounds are liquid materials which are somewhat soluble in many common organic solvents and of low solubility in water. The compounds are useful as herbicides for the control of the growth and the killing of many plant species such as wild oats and millet.

The new phenyl proparglyoxybenzoate compounds may be prepared by reacting propargyl chloride or propargyl bromide with a phenyl salicylate corresponding to the formula

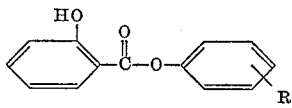

The reaction is carried out in a reaction medium such as acetone, diethyl ether, benzene or hexane and in the presence of a basic material such as an alkali metal carbonate. The reaction takes place smoothly at the temperature range of from about 34°–100° C. with the production of the desired product and halide of reaction. This halide appears in the reaction mixture as the salt of the metal in the employed basic material. The amounts of the reagents to be employed are not critical, some of the desired product being obtained when employing any proportion of ingredients. Where optimum yields are desired, substantially equimolecular proportions of the phenyl salicylate, propargyl halide and basic material are employed.

In carrying out the reaction, the phenyl salicylate, propargyl halide and basic material are dispersed in the reaction medium and the resulting mixture maintained for a period of time at a temperature of from 34° to 100° C. to insure completion of the reaction. The reaction mixture conveniently is then fractionally distilled under reduced pressure to separate low boiling constituents and to obtain the desired product as a liquid residue. This product may be further purified by conventional procedures such as washing with water, and washing and extracting with various organic solvents.

The following examples merely illustrate the invention and are not to be construed as limiting:

*Example 1.—4-Tert.Butylphenyl o-Propargyloxybenzoate*

4-tert.butylphenyl salicylate (204 grams; 0.75 mole), 125 grams (1 mole) of propargyl bromide and 144 grams (1 mole) of potassium carbonate were dispersed in 500 milliliters of acetone and the resulting mixture heated with stirring at the boiling temperature and under reflux for 80 hours. The reaction mixture was then filtered and the filtrate fractionally distilled under reduced pressure at gradually increasing temperature up to a temperature of 100° C. at 1 millimeter pressure to remove low boiling constituents and obtain a 4-tert.butylphenyl o-propargyloxybenzoate product as a liquid residue. This product had a density of 1.076 at 25° C. and a refractive index $n/D$ of 1.5375 at 25° C.

*Example 2.—Phenyl o-Propargyloxybenzoate*

Phenyl salicylate (214 grams; 1 mole), 120 grams (1 mole) of propargyl bromide and 140 grams (1 mole) of potassium carbonate were dispersed in 500 milliliters of acetone and the resulting mixture heated with stirring to the boiling temperature and under reflux for 80 hours. The reaction mixture was then filtered and the filtrate fractionally distilled under reduced pressure and gradually increasing temperatures up to a temperature of 100° C. at 1 millimeter pressure to remove low boiling constituents and obtain a phenyl o-proparyloxybenzoate product as a liquid residue. This product had a density of 1.169 at 25° C. and a refractive index $n/D$ of 1.5769 at 25° C.

In a similar manner other products of the present invention are prepared as follows:

2-methylphenyl o-propargyloxybenzoate by reacting together 2-methylphenyl salicylate and propargyl chloride.

4-amylphenyl o-propargyloxybenzoate by reacting together 4-amylphenyl salicylate and propargyl chloride.

3-methylphenyl o-propargyloxybenzoate by reacting together 3-methylphenyl salicylate and propargyl bromide.

2-butylphenyl o-proparyloxybenzoate by reacting together 2-butylphenyl salicylate and propargyl bromide.

4-ethylphenyl o-propargyloxybenzoate by reacting together 4-ethylphenyl salicylate and propargyl bromide.

The novel products of the present invention are useful as herbicides for the inhibition and control of the growth of the seeds, emerging seedlings and established plants of a number of weed and plant species. For such uses, the products are dispersed on an inert finely divided solid and employed as dusts. Such mixtures also may be dispersed in water with or without the aid of a surface active agent and the resulting aqueous suspensions employed as sprays. In other procedures, the products are employed as active constituents in solvent solutions, oil-in-water or water-in-oil emulsions or aqueous dispersions. In representative operations, the treatment of soil with the compounds of the present invention at a dosage of 12 pounds of compound per acre inch of soil, gives complete inhibition and kills of the seeds and emerging seedlings of millet and wild oats.

We claim:
1. A compound of the formula

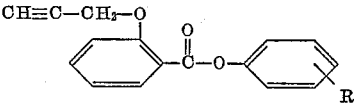

wherein R is a member of the group consisting of hydrogen and lower alkyl.
2. 4-tert.butylphenyl o-propargyloxybenzoate.
3. Phenyl o-propargyloxybenzoate.

References Cited in the file of this patent
Reppe et al.: Ann., 596, 38–79 (1955).